United States Patent
Bai et al.

(10) Patent No.: US 12,149,484 B2
(45) Date of Patent: Nov. 19, 2024

(54) VARIABLE HIGH THROUGHPUT CONTROL FIELD

(71) Applicant: HUAWEI TECHNOLOGIES CO., LTD., Shenzhen (CN)

(72) Inventors: Jiyang Bai, London (CA); Xianbin Wang, Kanata (CA); Jung Hoon Suh, Kanata (CA); Yan Xin, Kanata (CA); Osama Aboul-Magd, Ottawa (CA); Kwok Shum Au, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 424 days.

(21) Appl. No.: 17/583,429

(22) Filed: Jan. 25, 2022

(65) Prior Publication Data
US 2023/0239119 A1    Jul. 27, 2023

(51) Int. Cl.
*H04L 12/28* (2006.01)
*H04L 5/00* (2006.01)
*H04W 28/26* (2009.01)

(52) U.S. Cl.
CPC .......... *H04L 5/0064* (2013.01); *H04L 5/0053* (2013.01); *H04W 28/26* (2013.01)

(58) Field of Classification Search
CPC .................................................. H04L 5/0053
See application file for complete search history.

(56) References Cited

U.S. PATENT DOCUMENTS

| | | | | |
|---|---|---|---|---|
| 10,693,533 B2* | 6/2020 | Zhang | ..................... | H04L 5/005 |
| 2014/0112175 A1* | 4/2014 | Pantelidou | ............ | H04W 28/26 |
| | | | | 370/252 |
| 2016/0366254 A1* | 12/2016 | Asterjadhi | ............ | H04L 5/0091 |
| 2017/0171860 A1* | 6/2017 | Park | .................. | H04W 72/0453 |
| 2017/0294949 A1* | 10/2017 | Zhang | ................... | H04W 52/46 |
| 2017/0294992 A1* | 10/2017 | Chu | ..................... | H04L 27/2602 |

(Continued)

FOREIGN PATENT DOCUMENTS

| CN | 108234093 A | 6/2018 |
|---|---|---|
| CN | 113014366 A | 6/2021 |

OTHER PUBLICATIONS

IEEE Std 802.11ax—IEEE Standard for Information Technology—Telecommunications and Information Exchange between Systems—Local and Metropolitan Area Networks—Specific Requirements, Part 11: Wireless LAN Medium Access Control, (MAC) and Physical Layer (PHY) Specifications, Amendment 1: Enhancements for High-Efficiency WLAN, 2021.

(Continued)

*Primary Examiner* — Elisabeth Benoit Magloire

(57) ABSTRACT

The present disclosure provides for methods, systems and apparatus related to Variable High Throughput (HT) Control Field. An aspect of the disclosure provides for a method performed by a station (STA). The method includes sending, to a second STA, a message including a frame, the frame including a variable high throughput (HT) control field. The variable HT further includes a first subfield indicating an N number of control IDs, wherein N is equal to or more than one. The variable HT further includes N additional subfields. Each of the N additional subfield includes: a control identifier (ID) field and a control information field associated with the Control ID field. The method further includes receiving, from the second STA, a response.

20 Claims, 12 Drawing Sheets

600

(56) References Cited

U.S. PATENT DOCUMENTS

| | | | |
|---|---|---|---|
| 2019/0273553 A1* | 9/2019 | Li | H04B 17/318 |
| 2021/0136605 A1* | 5/2021 | Huang | H04W 28/06 |
| 2021/0410048 A1* | 12/2021 | Yu | H04W 48/14 |
| 2022/0255681 A1* | 8/2022 | Huang | H04L 1/1861 |
| 2022/0322460 A1* | 10/2022 | Xin | H04W 74/0866 |
| 2022/0376824 A1* | 11/2022 | Sun | H04L 1/1614 |

OTHER PUBLICATIONS

IEEE P802.11be—IEEE P802.11be™/D3.0 Draft Standard for Information technology—Telecommunications and information exchange between systems Local and metropolitan area networks—Specific requirements Part 11: Wireless LAN Medium Access Control, (MAC) and Physical Layer (PHY) Specifications, Amendment 8: Enhancements for extremely high throughput (EHT), Jan. 2023.

* cited by examiner

| Variant | B0 | B1 | B2-B29 | B30 | B31 |
|---|---|---|---|---|---|
| HT | 0 | | HT Control Middle | AC Constraint | RDG/More PPDU |
| VHT | 1 | 0 | VHT Control Middle | AC Constraint | RDG/More PPDU |
| HE | 1 | 1 | A-Control | | |

FIG. 2

| Control ID Value 502 | Meaning 504 | Length of the Control Information Subfield (bits) 506 | Content of the Control Information subfield 508 |
|---|---|---|---|
| 0 | Triggered response scheduling (TRS) | 26 | See 9.2.4.6a.1 (TRS Control) |
| 1 | Operating mode (OM) | 12 | See 9.2.4.6a.2 (OM Control) |
| 2 | HE link adaptation (HLA) | 26 | See 9.2.4.6a.3 (HLA Control) |
| 3 | Buffer status report (BSR) | 26 | See 9.2.4.6a.4 (BSR Control) |
| 4 | UL power headroom (UPH) | 8 | See 9.2.4.6a.5 (UPH Control) |
| 5 | Bandwidth query report (BQR) | 10 | See 9.2.4.6a.6 (BQR Control) |
| 6 | Command and status (CAS) | 8 | See 9.2.4.6a.7 (CAS Control) |
| 7 | EHT operating mode (EHT OM) | 6 | See 9.2.4.6a.8 (EHT OM Control) |
| 8 | Single response scheduling (SRS) | 10 | See 9.2.4.6a.9 (SRS Control) |
| 10 | AP assistance request (AAR) | 20 | See 9.2.4.6a.10 (AAR Control) |
| 9, 11-14 | Reserved | | |
| 15 | Ones need expansion surely (ONES) | 26 | Set to all 1s |

VARIABLE HIGH THROUGHPUT CONTROL FIELD

CROSS-REFERENCE TO RELATED APPLICATIONS

This is the first application filed for the present invention.

FIELD OF THE INVENTION

The present invention pertains to the field of communication networks, and in particular to methods and systems related to Variable High Throughput (HT) Control Field.

BACKGROUND

Future Wi-Fi, such as IEEE 802.11be, are expected to support massive stations (STAs) with diverse demands under complex network scenarios. To facilitate this endeavour, STAs may adopt one or more control mechanisms to enhance their performance. Control mechanism information can be exchanged among the STAs using the HT Control field in the Medium Access Control (MAC) layer. However, the current HT Control field may be inadequate to support effective and efficient control mechanisms information exchange. Using the existing HT control field may lead to inefficient use of resources with increased exchange delay. Further, as more and more control technologies are introduced and adopted, the existing HT control field may be inadequate to support such possible future technologies.

Therefore, there is a need for a method and a frame format that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides methods, systems and apparatus related to Variable HT Control Field. According to a first aspect of the disclosure, a method performed by a station (STA) is provided. The method includes sending, to a second STA, a message including a frame, the frame including a variable high throughput (HT) control field. The variable HT further includes a first subfield indicating an N number of control IDs, wherein N is equal to or more than one. The variable HT further includes N additional subfields. Each of the N additional subfield includes: a control identifier (ID) field and a control information field associated with the Control ID field. The method further includes receiving, from the second STA, a response. The method may provide for sending, within one frame, multiple HT control fields. Thus, the method may, at least reduce, delay associated with concurrent requests of HT control field from multiple mechanisms.

In some embodiments of the first aspect, the frame further includes a frame control field, and the frame control field indicates presence of the variable HT control field via a reserved subtype associated with the frame control field. The method may provide for using an extension of the frame format to enable the variable HT control field.

In some embodiments of the first aspect, the frame further includes a frame control field. In some embodiments of the first aspect, the frame control field indicates a control frame extension frame via a reserved subtype associated with the frame control field. In some embodiments of the first aspect, the frame further includes an extended subtype field. In some embodiments of the first aspect, the extended subtype field indicates presence of the variable HT control field via a reserved subtype associated with the extended subtype field. The method may provide for using one of the extended subtypes in the control frame extension frame to enable the variable HT control field.

In some embodiments of the first aspect, the frame control field indicates the control frame extension by setting the frame control field to 0110.

In some embodiments of the first aspect, the frame further includes a carried frame control field. In some embodiments of the first aspect, the carried frame control field indicates presence of the variable HT control field via a reserved bit associated with the carried frame control field. In some embodiments of the first aspect, the frame is a control wrapper frame carried frame, and the control field indicates an ID of the control wrapper frame. The method may provide for using a Control Wrapper Frame to enable the variable HT control field.

In some embodiments of the first aspect, the control ID field indicates a control mechanism, and the control information field indicates content of the control mechanism.

In some embodiments of the first aspect, the variable HT control field includes a third subfield for indicating a standard version. In some embodiments of the first aspect, the third subfield indicates a first standard version associated with the variable HT control field. In some embodiments of the first aspect, the frame includes a second variable HT control field including a subfield indicating a second standard version for the second variable HT control field. In some embodiments of the first aspect, the second standard version is version after the first standard version. The method may provide for sending, within one frame, aggregated control IDs with subordinated subfields. The method may provide for sending, within one frame, control mechanisms information associated with different standard versions.

In some embodiments of the first aspect, the variable HT control field is encoded before the second variable HT control field.

In some embodiments of the first aspect, the first subfield has a bit size of 8. In some embodiments of the first aspect, the control ID field has a bit size of 8. In some embodiments of the first aspect, the control information field has a bit size according to the content of the control mechanism. The method may provide for increased bit size, thereby allowing for increased capacity for communicating control mechanisms information.

In some embodiments of the first aspect, N is more than one. In some embodiments of the first aspect, the N additional subfield includes a first and a second additional subfield. In some embodiments of the first aspect, the first additional subfield includes: a first control ID field indicating a first control mechanism, and a first control information field indicating content of the first control mechanism. In some embodiments of the first aspect, the second additional subfield includes: a second control ID field indicating a second control mechanism and a second control information field indicating content of the second control mechanism. The method may provide for sending multiple HT control fields within one frame.

According to a second aspect of the disclosure, an apparatus is provided, where the apparatus includes modules configured to perform the methods, according to the different aspects described herein.

According to a third aspect, an apparatus is provided, where the apparatus includes: a memory, configured to store a program; a processor, configured to execute the program stored in the memory, and when the program stored in the memory is executed, the processor is configured to perform methods in one or more aspects described herein.

According to a fourth aspect, a computer readable medium is provided, where the computer readable medium stores program code executed by a device, and the program code is used to perform the methods in one or more aspects described herein.

According to a fifth aspect, a chip is provided, where the chip includes a processor and a data interface, and the processor reads, by using the data interface, an instruction stored in a memory, to perform the methods in one or more aspect described herein.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform the methods in one or more aspects disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2 illustrates an HT control field format according to an embodiment of the present disclosure.

FIG. 4 illustrates Control ID subfield values, according to an embodiment of the present disclosure.

It will be noted that throughout the appended drawings, like features are identified by like reference numerals.

DETAILED DESCRIPTION

As may be appreciated by a person skilled in the art, the HT Control field can be used for MAC layer control mechanism information exchange. The HT Control field can be present in a Control Wrapper frame, in QoS Data, QoS Null, and Management frames as determined by the +HTC subfield of the Frame Control field (illustrated in FIG. 1).

Figure 1:
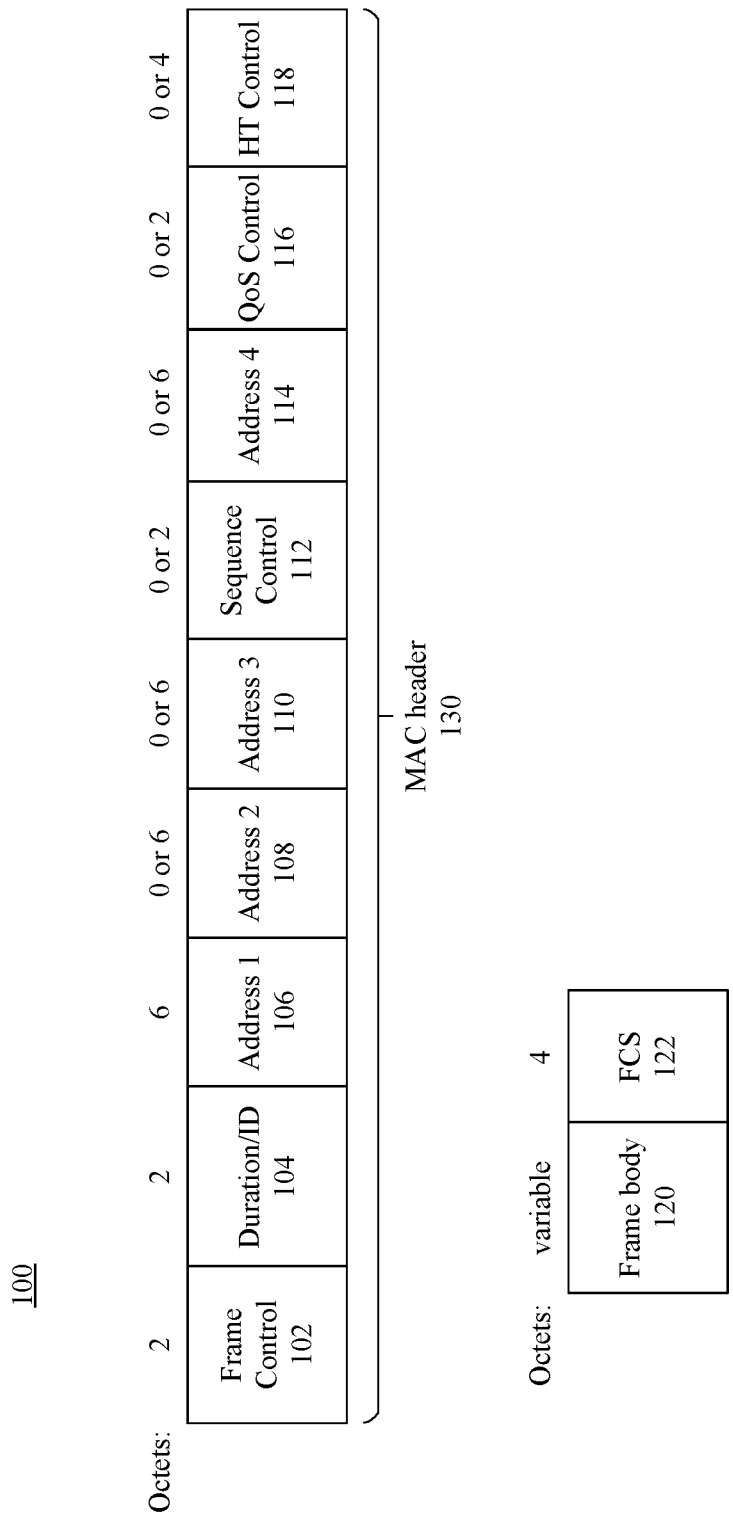
FIG. 1 illustrates a MAC header frame format according to an embodiment of the present disclosure.

FIG. 1 illustrates a Medium Access Control (MAC) header frame format according to an embodiment of the present disclosure. The MAC frame format 100 can refer to a MAC header 130 of a frame (e.g., control frame, management frame, data frame) as may be appreciated by a person skilled in the art. The frame format 100 can comprise a plurality of fields indicating frame control 102, duration/identifier (ID) 106, address 1 106, address 2 108, address 3 110, sequence control 112, address 4 114, quality of service (QoS) control 116, HT control 118. The rest of the frame, for which the MAC header 130 is a part of, can include additional fields indicating frame body 120, and Frame Checksum or frame check sequence (FCS) 122 as illustrated.

Each field in the frame format 100 can have an appropriate size. For example, frame control field 102 can be 2 octets; duration/ID field 104 can be 2 octets; address 1 field 106 can be 6 octets, address 2 field 108 can be 0 or 6 octets, address 3 field 110 can be 0 or 6 octets, sequence control field 112 can be 0 or 2 octets, address 4 field 114 can be 0 or 6 octets, QoS control field 116 can be 0 or 2 octets, and HT control field 118 can be 0 or 4 octets. The frame body 120 can be variable depending on the frame. The FCS field 122 can be 4 octets.

FIG. 2 illustrates an HT control field format according to an embodiment of the present disclosure. The HT control field format 200 can refer to an HT Control field format transmitted by a non-China millimeter-wave multiple gigabit (CMMG) station (STA). The HT control field format 200 can indicate one or more variants. For example, the format 200 can indicate an HT variant 202, a very high throughput (VHT) variant 204, and a high efficiency (HE) variant 206 as illustrated.

As illustrated, in each variant, an appropriate portion of the 4 octets of the HT control field 118 can be used to indicate one or more things. For example, in the HT variant 202, one bit, e.g., B0, can be set to 0; 29 bits, e.g., B1-B29, can be used to indicate HT Control Middle; 1 bit, e.g., B30, can be used to indicate Access Category (AC) constraint; and 1 bit, e.g., B31, can be used to indicate Reverse Direction Grant (RDG)/More PHY protocol data unit (PPDU).

Similarly, in the VHT variant 204, one bit, e.g., B0, can be set to 1, one bit, e.g., B1, can be set to 0; 28 bits, e.g., B2-B29, can be used to indicate VHT Control Middle; 1 bit, e.g., B30, can be used to indicate AC constraint; and 1 bit, e.g., B31, can be used to indicate RDG/More (PPDU).

In the HE variant 206, one bit, e.g., B0, can be set to 1, one bit, e.g., B1, can be set to 0; and 30 bits, e.g., B2-B31, can be used to indicate A-Control, as illustrated. Further, in HE variant 206, all new control mechanisms that are proposed in and after 802.11ax can be indicated in A-Control subfield 208.

Figure 3:
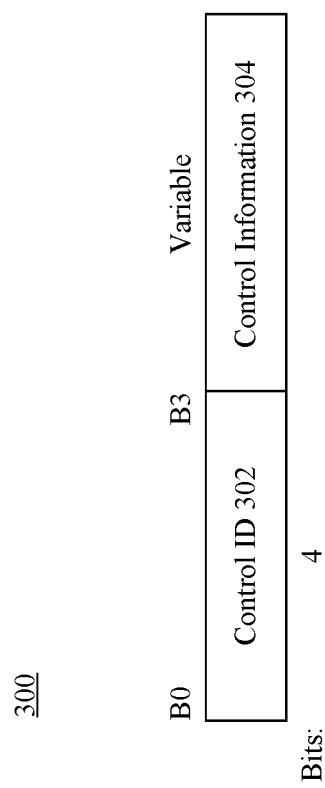
FIG. 3 illustrates a field format of the A-Control subfield, according to an embodiment of the present disclosure.

FIG. 3 illustrates a field format of the A-Control subfield, according to an embodiment of the present disclosure. The field format 300 can comprise one or more fields indicating control ID 302 and control information 304. The A-Control subfield 208 can be 30 bits, wherein 4 bits, e.g., the first 4 bits, can be used for Control ID definition. The Control ID subfield 304, via the allotted 4 bits, can indicate 16 different Control fields. The remaining 26-bits can indicate the Control Information for control mechanisms.

As may be appreciated by a person skilled in the art, the control ID subfield 302 can indicate 16 different types of control fields, 11 of which have already been indicated, as illustrated in FIG. 4. FIG. 4 illustrates Control ID subfield values, according to an embodiment of the present disclosure. For example, FIG. 4 can refer to the Control ID subfield values as of TGbe D1.0 (802.11 Task Group "be", Spec Draft 1.0). The different types of Control fields are indicated in column 502, Control ID Value. The meaning of the respective Control ID value is indicated in column 504. The length of the control information subfield 304 corresponding to the respective control ID value is indicated in column 506. The Content of the Control Information subfield can be indicated, for example, in column 508 (referring to "subclauses" in "802.11ax-2021.pdf").

As mentioned, 11 different types of control fields have already been indicated in the control ID subfield 302. The remaining 5 control ID values (e.g., 9, 11-14) are reserved for future indications. As illustrated, the length of the control information subfield may vary depending on the control ID value, and some Control IDs do not require all the remaining 26 bits for the Control Information. The remaining bits not used for Control Information can be padded with zero.

Figure 5:
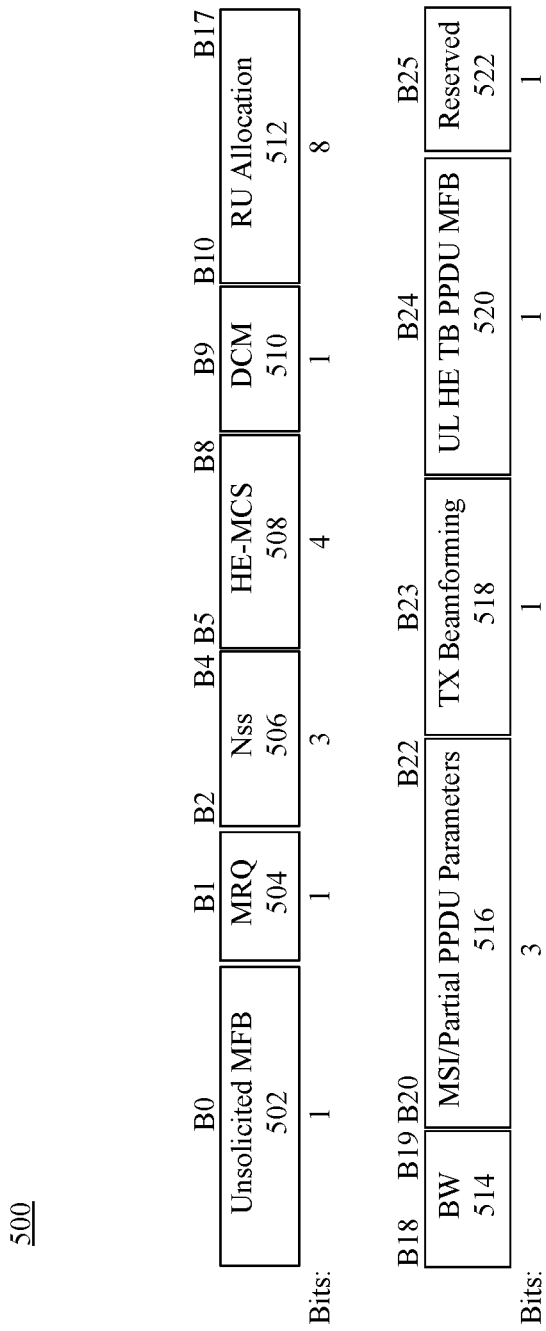
FIG. 5 illustrates a High Efficiency Link Adaptation (HLA) control field format according to an embodiment of the present disclosure.

FIG. 5 illustrates a High Efficiency Link Adaptation (HLA) control field format according to an embodiment of the present disclosure. Referring to FIG. 4, wherein the control ID subfield 302 indicates a control ID value of 2, e.g., its value is "0010", the control subfield indicates an HLA Control field. Accordingly, the control information subfield 304 can use 26 bits to indicate the corresponding control information for the HLA Control Field.

As illustrated, the control information subfield format 500 can include a plurality of fields indicating: unsolicited Modulation and Coding System (MCS) Feedback (MFB) 502, MCS Request (MRQ) 504, Number of Spatial Stream (Nss) 506, HE-MCS 508, Dual coded Modulation (DCM) 510, Resource Unit (RU) allocation 512, Bandwidth (BW) 514, MRQ Sequence Identifier (MSI)/Partial PPDU Parameters 516, Transmitter (TX) Beamforming 518, Uplink (UL) HE Trigger Based (TB) PPDU MFB 520, and a reserved field 522. An appropriate number of bits, of the 26 allotted bits, can be used for each field as illustrated.

As mentioned herein, future Wi-Fi, such as the next amendments of the IEEE 802.11be, is expected to support massive stations (STAs) with diverse demands under complex network scenarios. To enhance the downlink transmission performance for each STA in a dynamic network, the access point (AP) in IEEE 802.11ax can adopt an HLA mechanism. The HLA mechanism can be adopted by soliciting the Modulation and Coding Scheme (MCS), Number of Space Time Stream (NSTS), Band Width (BW) and Resource Units (RUs) allocations, which can be carried in A-Control field 208 with Control ID set to "0010".

For more adaptive link adaptation (LA) mechanism, more LA parameters may be required in EHT/EHT+. Examples of more LA Parameters can be the Signal to Interference and Noise Ratio (SINR), MCS-NSTS for Multiple User Multiple Input Multiple Output (MU-MIMO), etc. However, limited by 32-bits HT control field (26-bits available in HLA subfield, as shown in FIG. 5), there is no additional bit to include more information.

In addition, current HT Control field only carries one Control ID at a PPDU see FIG. 1). If multiple mechanisms in an HE variant request transmissions simultaneously, they must be transmitted in multiple PPDUs, which may lead to significant delay.

Moreover, the existing frame structure design of HT control field can limit the number of possible future MAC layer control technologies. Aiming at the intelligent wireless network, more MAC layer control mechanisms/functions are likely to be implemented in future Wi-Fi technologies. As such, the existing 5 types of reserved Control ID, indicated in FIG. 4, may not be enough.

Figure 6:
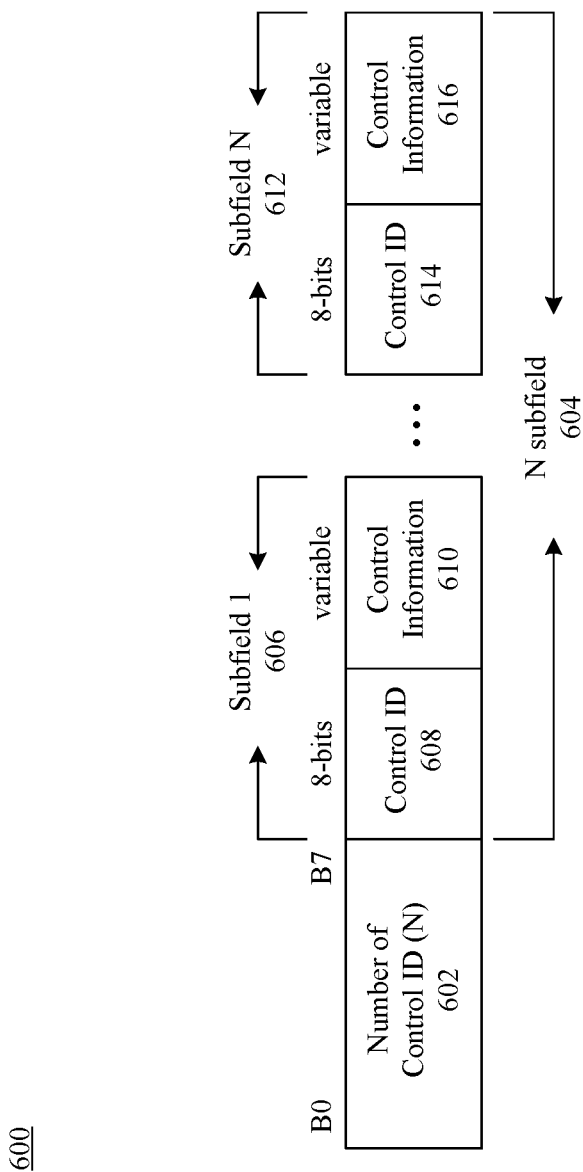
FIG. 6 illustrates a variable HT Control Field format according to an embodiment of the present disclosure.

Embodiments described herein may provide for a Variable HT Control field. FIG. 6 illustrates a variable HT Control Field format according to an embodiment of the present disclosure. Within the Variable HT Control Field 600, the number of HT control mechanisms or control ID (N) can be indicated in first 8 bits (B0-B7). As illustrated, this portion can be referred to number of Control ID (N) subfield 602. Following the number of HT subfield 602, there can be N HT Control subfields 604. Each HT Control subfield can comprise one or more fields for indicating a control ID and Control Information. In an embodiment, the control ID field (e.g., 608, . . . , 614) in each subfield (e.g., 606, . . . , 612) can be 8-bits. The Control ID field in each subfield can indicate the type of subfield. The length of the control Information can be defined by the type of the HT control subfield, which can be indicated via the Control ID subfield (e.g., 610, . . . , 616).

Thus, embodiments may provide for a Variable HT Control Field that is not limited to 4-Bytes. Accordingly, each Control Subfield, such as HLA Control Field, can contain more parameters. In addition, the aggregated Control IDs with the subordinated subfields can be transmitted in one PPDU. Thus, transmission delay from concurrent requests of HT control field from multiple mechanisms may be at least reduced. Further, since the Control ID field (e.g., 608, . . . , 614) can be 8 bits (an increase from 4-bits of Control ID field of 302), the Variable HT Control Field 600 can support 256 different types of Control Subfields. Taking into account the 11 types of Control subfields that are already defined as mentioned reference in FIG. 4, the Variable HT Control Field 600 can provide 245 reserved Control IDs for future technologies (in comparison to reserving just 5 as mentioned in reference to FIG. 4).

In an embodiment, a transceiver receiving a message comprising a frame with a Variable HT Control Field may determine N, the number of HT Control mechanism based on the Number of Control ID (N) field 602. Accordingly, the transceiver may determine the number of subfields N 604 that follows the Number of Control ID (N) field 602. Each subfield in the N subfields may indicate a control mechanism based on the control ID field and further indicate the control information associated with the control mechanism in the control information field. Accordingly, the transceiver can decode all information included in the frame.

Figure 7:
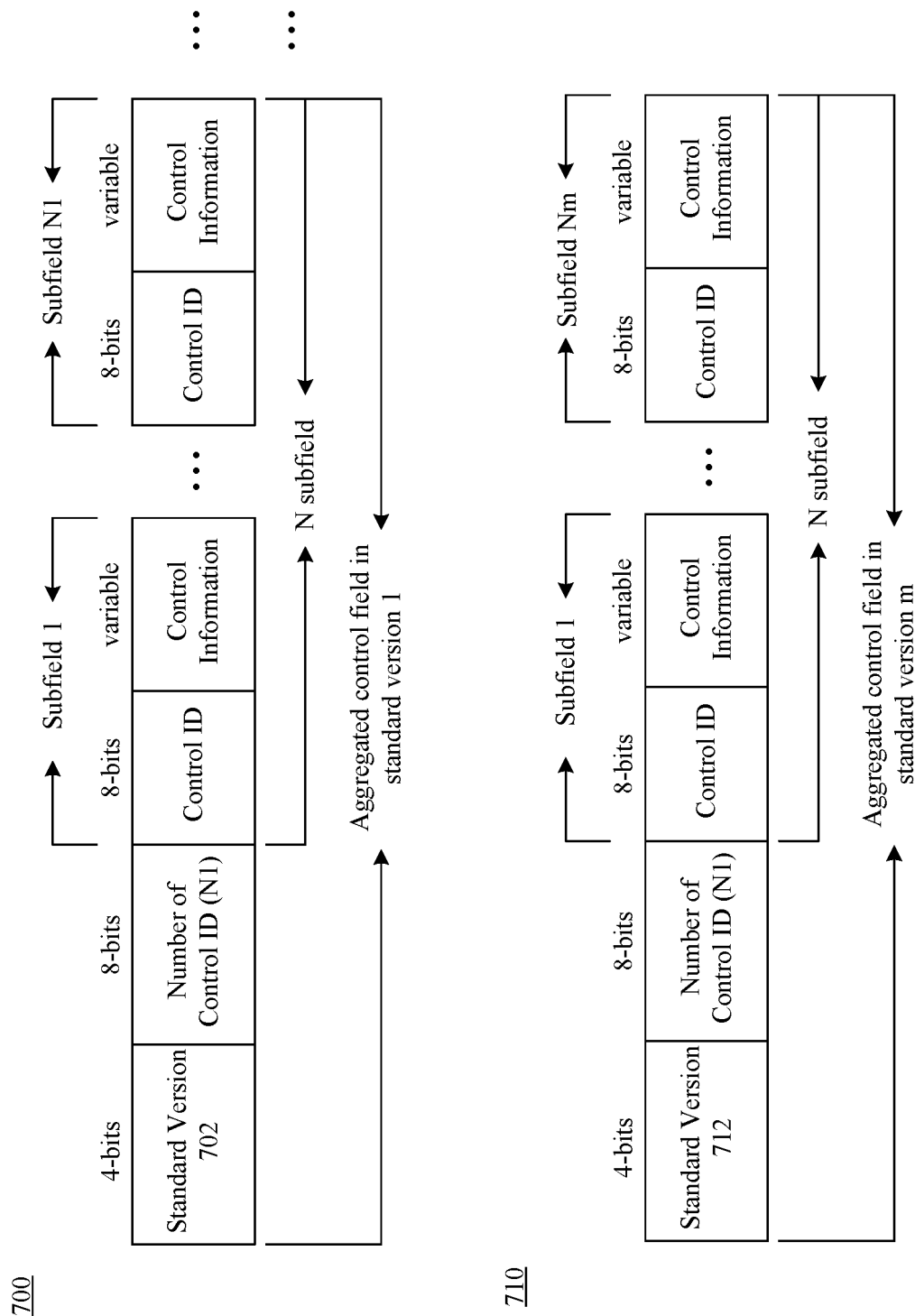
FIG. 7 illustrates another Variable HT Control Field, according to an embodiment of the present disclosure.

FIG. 7 illustrates another Variable HT Control Field, according to an embodiment of the present disclosure. The Variable HT Control Fields 700 and 710 may support multiple standard versions in the future. For example, Variable HT Control Fields 700 may support a first (older) standard vision (e.g., 11ax), and Variable HT Control Fields 710 may support an $m^{th}$ (later or future) standard version (e.g., 11be). Accordingly, each of the Variable HT Control Fields 700 and 710 can include a field for indicating the standard version (e.g., 702 and 712). The Standard Version field 702 and 712 may provide for an indication or consideration of standard capabilities, since each standard version may offer different capabilities (control mechanisms). Further, Control IDs may differ from one standard version to another, thus the Standard Version field 702 and 712 can provide an indication of which standard version are the Control IDs associated with. Further, embodiments of FIG. 7, may provide for transmitting, in one PPDU, multiple Variable HT Control Fields of different standard versions.

In an embodiment, a message comprising frames associated with both older and future standard versions can be transmitted such that the frame associated with the older standard version are received before the frame associated with the future standard version. According, a transceiver receiving the frames can decode the frame associated with the older standard version before the frame associated with the future standard version. This way, a transceiver that is unable to identify the frame associated with the future standard version (as would be indicated in the standard version field) would still be able to decode information in the frame associated with the older standard version.

The remaining fields of the Variable HT Control Fields 700 and 710 can be similar to the Variable HT Control Field 600 with appropriate modification as appreciated by a person skilled in the art.

Embodiments described herein may provide for different solutions for enabling the Variable HT Control Field in different transmission scenarios.

Figure 8:
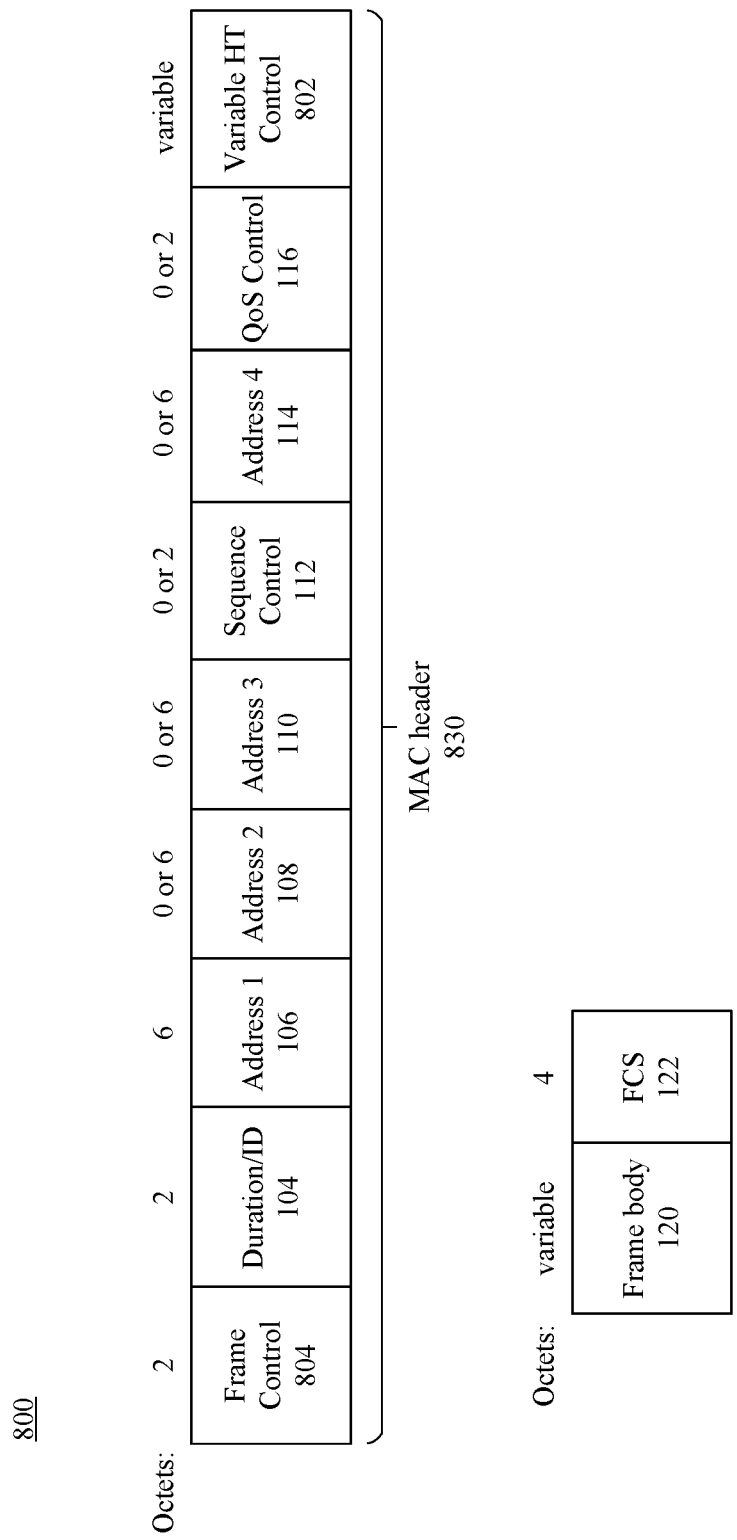
FIG. 8 illustrates an enhanced MAC header frame format according to an embodiment of the present disclosure.

FIG. 8 illustrates an enhanced MAC header frame format according to an embodiment of the present disclosure. The enhanced MAC header frame format 800 comprises a Variable HT Control field 802, which may be similar to the Variable HT Control field 600, 700, or 710.

The HT Control Field can be transmitted in a Management frame or in a Data frame in the incumbent 802.11 system. There is still Reserved subtypes available in the Management or Data frame for transmitting the HT Control Field. In an embodiment, one of the Reserved subtype in the Frame Control field 804 of MAC header can be used to indicate the presence of Variable HT Control Field 802.

In some embodiments, one of the available Reserved subtype in a Control Frame can be used to indicate the presence of the Variable HT Control Field, for piggyback transmission with Control Frame. Piggyback transmission refers to the embodiments in which Variable HT Control field can be carried in the MAC header of a Control frame. Thus, in some embodiments, the Variable HT Control Field can be implemented through extensions of the frame format (e.g., MAC header frame format of FIG.8).

Figure 9:
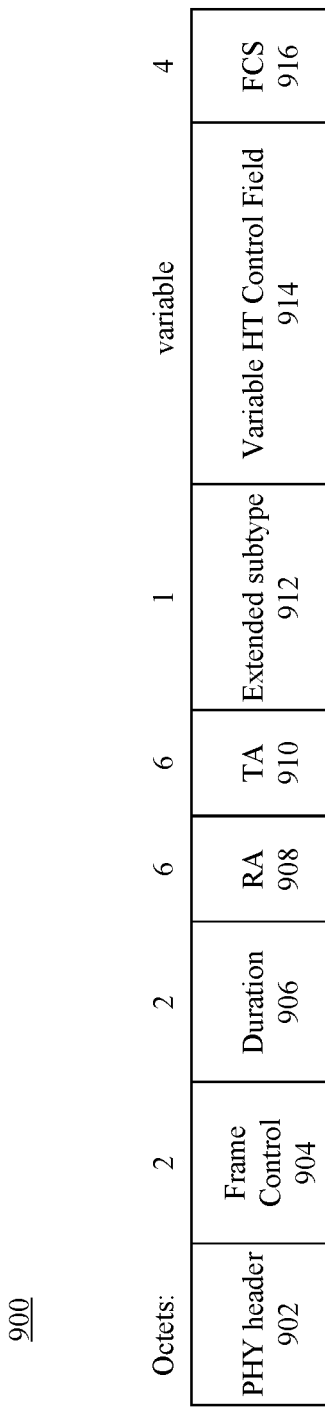
FIG. 9 illustrates a Variable HT Control Field in Control Frame Extension, according to an embodiment of the present disclosure.

In some embodiments, the Control Frame Extension subtype in the Control Frame can be used to enable the Variable HT Control Field. FIG. 9 illustrates a Variable HT Control Field in Control Frame Extension, according to an embodiment of the present disclosure. In an embodiment, the Control Frame Format 900 can comprise one or more fields indicating: physical layer (PHY) header 902, Frame Control 904, Duration 906, receiver address (RA) 908, transmitter address (TA) 910, Extended subtype 912, Variable HT Control field 914, FCS 916. Each of the fields can be an appropriate size as illustrated. The Variable HT Control field 914 may be similar to the Variable HT Control Field 600, 700, and 710.

In an embodiment, one of the Extended subtypes 912 can be used to indicate the presence of the Variable HT Control Field 914. For example, the 4-bits subtype subfield of the Frame Control Field 904 in the MAC header can be set to 0110, which can indicate the Control Frame Extension frame. One of the Extended subtypes in the Control Frame Extension frame (e.g., the Extended subtype field 912) can then indicate the presence of the Variable HT Control Field 914. Remaining subfields following the Extended subtype subfield 912 can be the main body of the Control frame which corresponds to the Variable HT Control Field. Different from Piggyback transmission embodiment (which is discussed in reference to FIG. 8), in some embodiments, including embodiments of FIG. 9, the Variable HT Control Field can be transmitted individually.

Accordingly, in some embodiments, e.g., embodiments of FIG. 9, the Variable HT Control field can be enabled without consuming any subtype in the Frame Control field.

Figure 10:
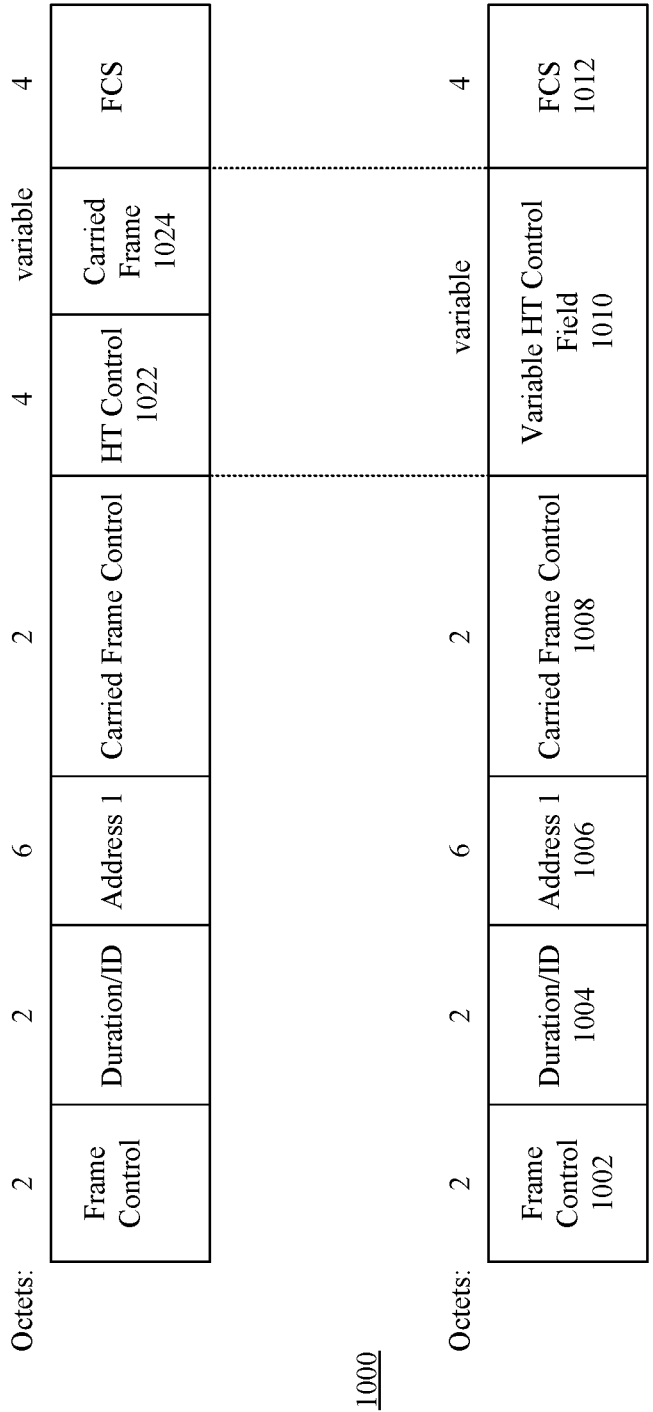
FIG. 10 illustrates a Variable HT Control Field in an enhanced Control Wrapper Frame format, according to an embodiment of the present disclosure.

In some embodiments, the modified Control Wrapper Frame, which is also a type of individual transmission, can be used to enable or implement the Variable HT Control Field. FIG. 10 illustrates a Variable HT Control Field in an enhanced Control Wrapper Frame format, according to an embodiment of the present disclosure. The enhanced Wrapper Frame format 1000 can include the Variable HT Control Field 1010 in addition to other fields including: Frame Control 1002, Duration/ID 1004, Address 1 1006, Carried Frame Control 1008, and FCS 1012. The Variable HT Control Field 1010 can be similar to the Variable HT Control Field 600, 700, and 710.

As may be appreciated by a person skilled in the art, a Control Wrapper Frame 1020 can be viewed as a type of control frame that is used to add the HT Control Field 1022 (carries control information) to other Control Frames. In an embodiment, the Control Wrapper Frame 1020, which comprises fields including HT Control field 1022 and Carried Frame 1024 can be used to enable the Variable HT Control Field.

However, the Control Wrapper Frame cannot wrap the Control Wrapper Frame itself, which has no meaning in conventional frame structure definition. In an embodiment, the Control Wrapper Frame can be used as the new control frame for individual transmission of Variable HT control field.

In an embodiment, the Carried Frame Control field 1008 (via a Reserved bit) can be used to indicate the presence of the Variable HT Control field 1010. For example, when the Carried Frame Control field 1008 is equal to the ID of Control Wrapper Frame, the HT Control field 1022 and the Carried Frame field 1024 can be replaced by the Variable HT Control Field 1010, as shown. Therefore, the enhanced Wrapper Control Frame 1000 can be used to transmit the Variable HT Control Field 1010 individually.

Embodiments described herein may provide for a Variable HT Control Field. In some embodiments described herein, the Variable HT Control Field may be enabled via using one of the available Reserved subtypes in the Management frame, Control frame, and Data frame. In some embodiments described herein, the Variable HT Control Field may be enabled via using the Control Frame Extension subtype of the Control Frame. In some embodiments described herein, the Variable HT Control Field may be enabled via using the modified or enhanced Control Wrapper frame.

Figure 11:
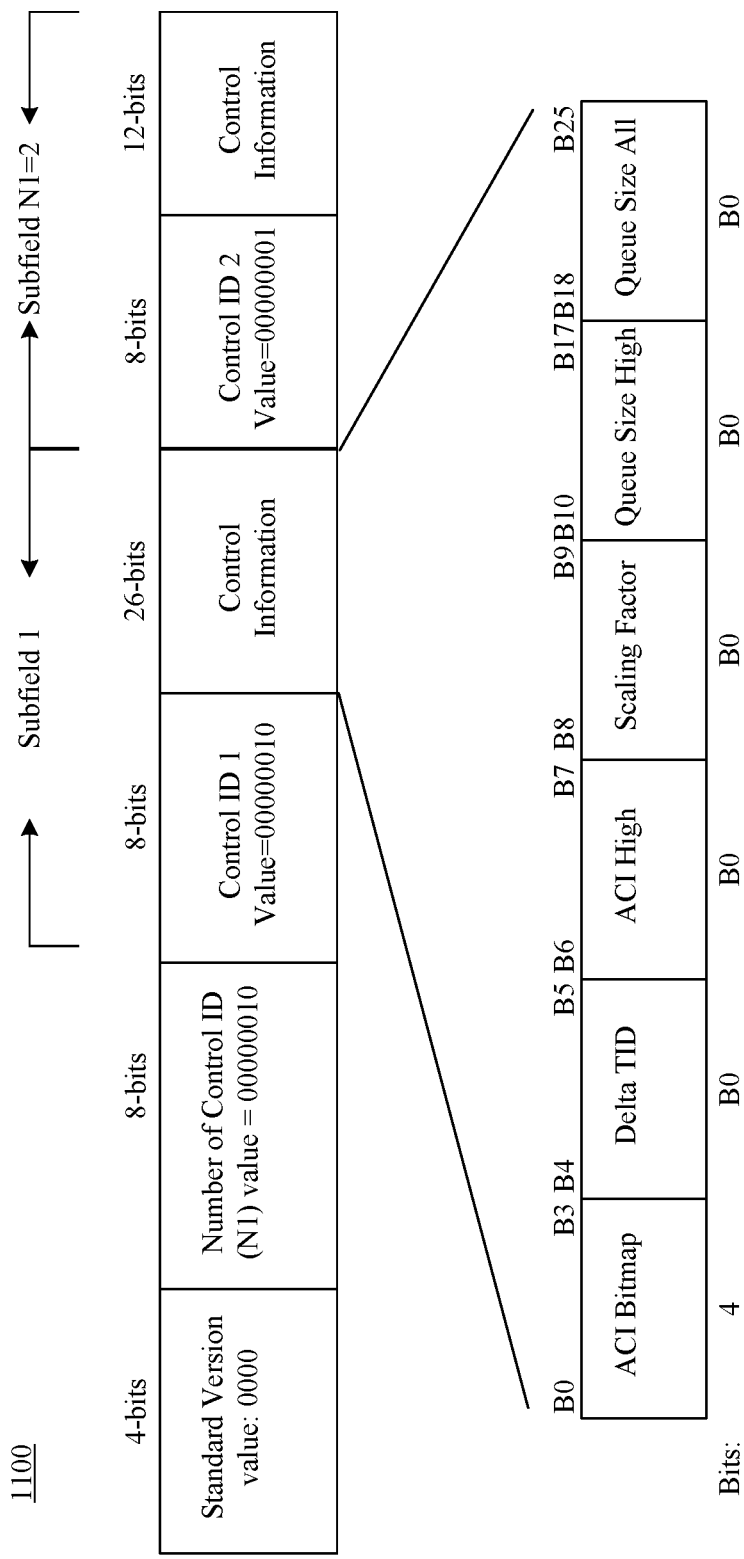
FIG. 11 illustrates an example Variable HT Control Field according to an embodiment of the present disclosure.

FIG. 11 illustrates an example Variable HT Control Field according to an embodiment of the present disclosure. In an embodiment, one AP STA and one non-AP STA can exist. The AP STA can have multiple MAC layer control mechanisms for transmitting to the non-AP STA. For example, the AP STA wishes to transmit control information (e.g., HE Link Adaptation (Control ID=2 in FIG. 4, "0000010") and Operating mode (Control ID=1 in FIG. 4, "00000001").

The AP STA can send transmit the control information via embodiments described herein to the non-AP STA. In an embodiment, the AP STA can generate a Variable HT Control Field 1100, wherein the Number of HT control mechanisms N=2, "00000010", followed by two control subfields (subfield 1, and subfield N1=2) as illustrated. In an embodiment, the AP STA can generate a data frame based on the subtype of the Data Frame and include the generate Variable HT Control Field 1100 in the MAC header. Thereafter, the AP STA can transmit the generated data frame to the non-AP STA.

In an embodiment, Control ID of subfield 1 can indicate a control ID of 2, "00000010", which according to FIG. 4 can refer to HLA. Based on the Control ID, the Control Information field of subfield 1 can indicate the control information according to FIG. 4 for example. In this case, the length of the control information for HLA is 26 bits. The content of the HLA are also illustrated, which can include: Access Category Indicator (ACI) Bitmap, Delta TX ID (TID), ACI High, Scaling Factor, Queue Size High, and Queue Size All.

Similarly, Control ID of subfield 2 can indicate a control ID of 1, "00000001", which according to FIG. 4 can refer to OM. Based on the Control ID, the Control Information field of subfield 2 can indicate the control information according to FIG. 4 for example. In this case, the length of the control information for HLA is 12 bits.

Embodiments described herein may provide for an encoding procedure for the Variable HT Control Field. In an embodiment, an encoder aggregating the Control Subfields that are defined in one version of standard into correlative aggregated control subfields. For example, the first Aggregated Control Subfield aggregates the Control Subfields that are defined in the first version (oldest standard version), the second Aggregated Control Subfield only aggregates the Control Subfields that are defined in the second version (a version after the first version, through may need be version that is immediately after). In this way, the encoder encodes the Control Subfields from the oldest to the newest version. Accordingly, the sequence of the Aggregated Control Subfields follows from the oldest standard version to the newest.

In each Aggregated Control Subfield, the encoder can indicate the number of aggregated Control ID with the subordinated subfields in the Number of Control ID, as described herein.

The encoder can encode each Control Subfield according to the Control ID Value Table (e.g., FIG. 4).

Embodiments described herein may provide for a decoding procedure for the Variable HT Control Field. In an embodiment, a decoder can check the first 4 bits, i.e., Standard Version field, to verify the standard version of the Control Subfields that follows.

If the decoder supports the identified version of standard, the decoder can check the next 8 bits, i.e., Number of Control IDs, to record the total Control Subfields in this Aggregated Control Subfield. The Decoder can then check the next 8 bits, i.e., the Control ID of the $1^{st}$ Control Subfield and find the definition of its Control Information according to Control ID Value Table (e.g., FIG. 4).

Since the length of Control Subfields are defined in Control ID Value Table, the decoder is aware of the end bit of the $1^{st}$ Control Subfield. So, the decoder can repeat the same procedures for the subsequent Control Subfields in the Aggregated Control Subfield until the last Control Subfield. The decoder, being aware of the number of Control Subfields (based on the number of Control IDs) can determine how many Control Subfields exists for decoding.

When the decoder finishes all Control Subfields in this Aggregated Control Subfield, it can perform the decoding procedure for the next Aggregated Control Subfield (based on a standard version that is after the decoded Aggregated Control Subfield). The decoder can thus continue to decode the remaining, if any, of the Aggregated Control Subfield according to the sequence of older to newer standard version (similar to the sequence of encoding as described herein).

Figure 12:
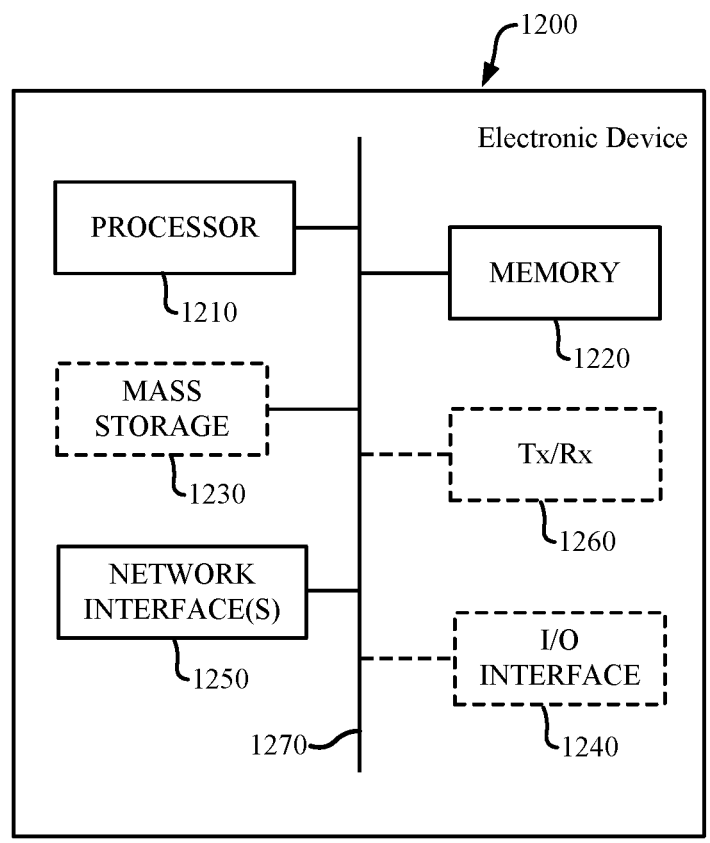
FIG. 12 is a schematic diagram of an electronic device that may perform any or all of operations of the above methods and features explicitly or implicitly described herein, according to different embodiments of the present invention.

FIG. 12 is a schematic diagram of an electronic device 1200 that may perform any or all of operations of the above methods and features explicitly or implicitly described herein, according to different embodiments of the present invention. For example, a computer equipped with network function may be configured as electronic device 1200. In some embodiments, the electronic device 1200 may be an AP, a STA, or the like as appreciated by a person skilled in the art.

As shown, the electronic device 1200 may include a processor 1210, such as a Central Processing Unit (CPU) or specialized processors such as a Graphics Processing Unit (GPU) or other such processor unit, memory 1220, non-transitory mass storage 1230, input-output interface 1240, network interface 1250, and a transceiver 1260, all of which are communicatively coupled via bi-directional bus 1270. According to certain embodiments, any or all of the depicted elements may be utilized, or only a subset of the elements. Further, electronic device 1200 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method by a station (STA), the method comprising:
sending, to a second STA, a message comprising a frame, the frame including a variable high throughput (HT) control field comprising:
a first subfield specifying, via a single value, an N number of control IDs, wherein N is equal to or more than one; and
N additional subfields, the N additional subfields being separate from the first subfield, each of the N additional subfields comprising:
a control identifier (ID) field; and
a control information field associated with the Control ID field.

2. The method of claim 1, wherein:
the frame further includes a frame control field; and
the frame control field indicates presence of the variable HT control field via a reserved subtype associated with the frame control field.

3. The method of claim 1, wherein:
the frame further includes a frame control field;
the frame control field indicates a control frame extension frame via a reserved subtype associated with the frame control field;
the frame further includes an extended subtype field;
the extended subtype field indicates presence of the variable HT control field via a reserved subtype associated with the extended subtype field.

4. The method of claim 3, wherein the frame control field indicates the control frame extension by setting the frame control field to 0110.

5. The method of claim 1, wherein:
the frame further includes a carried frame control field; and
the carried frame control field indicates presence of the variable HT control field via a reserved bit associated with the carried frame control field.

6. The method of claim 5, wherein:
the frame is a control wrapper frame carried frame; and
the control field indicates an ID of the control wrapper frame.

7. The method of claim 1, wherein:
the control ID field indicates a control mechanism; and
the control information field indicates content of the control mechanism.

8. The method of claim 1, wherein the variable HT control field comprises a third subfield for indicating a standard version.

9. The method of claim 8, wherein:
the third subfield indicates a first standard version associated with the variable HT control field;
the frame includes a second variable HT control field comprising a subfield indicating a second standard version associated with the second variable HT control field; and
the second standard version is version after the first standard version.

10. The method of claim 9, wherein the variable HT control field is encoded before the second variable HT control field.

11. The method of claim 1, wherein
the first subfield has a bit size of 8;
the control ID field has a bit size of 8 and indicates a control mechanism; and
the control information field has a bit size according to the content of the control mechanism.

12. The method of claim 1, wherein:
N is more than one;
the N additional subfields comprise a first and a second additional subfield;

the first additional subfield comprising:
  a first control ID field indicating a first control mechanism; and
  a first control information field indicating content of the first control mechanism; and
the second additional subfield comprising:
  a second control ID field indicating a second control mechanism; and
  a second control information field indicating content of the second control mechanism.

13. An apparatus comprising:
at least one processor and at least one machine-readable medium storing executable instructions which when executed by the at least one processor configure the apparatus for:
  sending, to a station (STA), a message comprising a frame, the frame including a variable high throughput (HT) control field comprising:
    a first subfield specifying, via a single value, an N number of control IDs, wherein N is equal to or more than one; and p3 N additional subfields, the N additional subfields being separate from the first subfield, each of the N additional subfields comprising:
      a control identifier (ID) field; and
      and a control information field associated with the Control ID field.

14. The apparatus of claim 13 wherein:
the frame further includes a frame control field; and
the frame control field indicates presence of the variable HT control field via a reserved subtype associated with the frame control field.

15. The apparatus of claim 13 wherein:
the frame further includes a frame control field;
the frame control field indicates a control frame extension frame via a reserved subtype associated with the frame control field;
the frame further includes an extended subtype field;
the extended subtype field indicates presence of the variable HT control field via a reserved subtype associated with the extended subtype field.

16. The apparatus of claim 15, wherein the frame control field indicates the control frame extension by setting the frame control field to 0110.

17. The apparatus of claim 13, wherein:
the frame further includes a carried frame control field; and
the carried frame control field indicates presence of the variable HT control field via a reserved bit associated with the carried frame control field.

18. The apparatus of claim 13, wherein:
the control ID field indicates a control mechanism; and
the control information field indicates content of the control mechanism.

19. The apparatus of claim 13, wherein the variable HT control field comprises a third subfield for indicating a standard version.

20. The apparatus of claim 19, wherein:
the third subfield indicates a first standard version associated with the variable HT control field;
the frame includes a second variable HT control field comprising a subfield indicating a second standard version associated with the second variable HT control field; and
the second standard version is version after the first standard version.

* * * * *

UNITED STATES PATENT AND TRADEMARK OFFICE
CERTIFICATE OF CORRECTION

PATENT NO. : 12,149,484 B2
APPLICATION NO. : 17/583429
DATED : November 19, 2024
INVENTOR(S) : Jiyang Bai et al.

Page 1 of 1

It is certified that error appears in the above-identified patent and that said Letters Patent is hereby corrected as shown below:

In the Claims

Column 13, Line 22, "more than one; and p3 N additional subfields, the" should read --more than one; and N additional subfields, the--.

Signed and Sealed this
Fourth Day of February, 2025

Coke Morgan Stewart
*Acting Director of the United States Patent and Trademark Office*